(12) United States Patent
Rich et al.

(10) Patent No.: US 7,327,727 B2
(45) Date of Patent: Feb. 5, 2008

(54) ATOMIC LOOKUP RULE SET TRANSITION

(75) Inventors: Scott Rich, Sunnyvale, CA (US);
Sandeep Lodha, Sunnyvale, CA (US);
Ram Krishnan, Santa Clara, CA (US);
Robert Pfile, Oakland, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 983 days.

(21) Appl. No.: 10/449,628

(22) Filed: May 30, 2003

(65) Prior Publication Data

US 2003/0223421 A1    Dec. 4, 2003

Related U.S. Application Data

(60) Provisional application No. 60/385,918, filed on Jun. 4, 2002.

(51) Int. Cl.
*H04L 12/28* (2006.01)
*H04L 12/56* (2006.01)

(52) U.S. Cl. .............. 370/389; 370/392; 370/382; 711/108; 711/216; 709/238; 709/204

(58) Field of Classification Search ............... None
See application file for complete search history.

(56) References Cited

U.S. PATENT DOCUMENTS

| | | | |
|---|---|---|---|
| 6,882,999 B2* | 4/2005 | Cohen et al. ............... | 707/6 |
| 7,054,993 B1* | 5/2006 | Srinivasan et al. ......... | 711/108 |
| 2004/0054671 A1* | 3/2004 | Cohen et al. ............... | 707/3 |

* cited by examiner

*Primary Examiner*—Chirag G. Shah

(57) ABSTRACT

Performing atomic lookup rule set transitions. A method involves performing lookups using a first set of rules, flagging a subset of the first set of rules as old rules, adding a second set of rules while continuing to perform lookups using the first set of rules, and atomically transitioning to perform lookups using the first set of rules plus the second set of rules minus the old rules. A system implementing the method includes a lookup table and a lookup table management module that is configured to make atomic lookup rule set transitions in the lookup table.

19 Claims, 5 Drawing Sheets

ATOMIC LOOKUP RULE SET TRANSITION

CROSS REFERENCE TO RELATED APPLICATION

This application is entitled to the benefit of provisional Patent Application Ser. No. 60/385,918, filed 4 Jun. 2002.

FIELD OF THE INVENTION

The invention relates to performing lookups at network nodes, and more particularly to transitioning between lookup rule sets used for lookups.

BACKGROUND OF THE INVENTION

Internet protocol (IP) routing involves transmitting packets from a source to a destination through a series of hops. Lookups are performed frequently in the process of handling network traffic. For example, lookups may be used to implement an access control list (ACL), policy routing, rate shaping, and quality of service (QoS). Determining the next hop of a packet involves, for example, looking up the destination address of the packet in a route lookup table. When performing a lookup, information from incoming packets, such as header information, is used to compare against information stored in a lookup table to determine how the packet should be handled. In the process of handling network traffic, multiple hookups may be performed using information from different protocol layers, such as layer three (3) and layer four (4), where the layers are defined by the International Standards Organization (ISO) in the Open System Interconnection (OSI) model. As defined in the OSI model, layer 3 (L3) (also referred to as the network layer) is used to route data to different routers based on destination IP addresses. Layer 4 (L4) (also referred to as the transport layer) can be used to ensure delivery of an entire file or message. L3 lookups are commonly performed in order to determine a next hop for a packet. L4 lookups are commonly performed to implement a traffic distribution policy or for access control.

The speed with which route lookups are performed is one factor that determines the throughput of a router. Traditional routers have used random access memory (RAM) and software based lookups to determine the next hop of packets. However, RAM and software based lookups have become a bottleneck in newer high-speed routers.

CAM arrays are now being used as a way to speed route table lookups. "Ternary" or "tertiary" CAMs are being used to perform route table lookups in networks that require longest prefix matching, such as networks that utilize Classless Inter Domain Routing (CIDR). Ternary CAMs can perform compare operations on bits that are "0", "1", or "X", where "X" is a wildcard or "don't care" value. In order to accomplish compare operations on bits that are "0", "1", or "X", ternary CAMs store a prefix mask word in addition to a CAM entry word. The prefix mask word associated with each CAM entry indicates the number of significant bits that must be matched in each CAM entry. That is, the prefix mask word identifies the bits that fall into the "X" category.

CIDR specifies longest prefix matching and because multiple matches may occur in a route lookup, the longest prefix match must be determined from the multiple matches. The most common technique for determining the longest prefix match from multiple matches involves prioritizing all of the route entries in a lookup table by prefix length, with the longest prefix length having the highest priority and the shortest prefix length having the lowest priority. The longest prefix match is determined by selecting the matching entry with the highest priority among all of the matching entries.

When a best match is made, the system typically checks a database to find routing information associated with the best match. For example, if a router receives a packet with a destination IP address of A.B.C.D, a best match in the database may be A.B.C.D, and the database may include an entry A.B.C.D with routing information associated with that entry. The system forwards the packet according to the routing information.

When lookup rules are updated, the system matches packets to the updated rules and forwards the packets accordingly. The rules are typically added one at a time. Thus, a first rule for a traffic class may be active while a second rule is not. This results in packets matching transient state rules (i.e., rules that are going to be changed in accordance with a rule set that is currently being added). It would be advantageous to implement a new rule set while avoiding transient state rule matches.

SUMMARY OF THE INVENTION

A method for performing atomic lookup rule set transitions involves performing lookups using a first set of rules, flagging a subset of the first set of rules as old rules, adding a second set of rules while continuing to perform lookups using the first set of rules, and atomically transitioning to perform lookups using the first set of rules plus the second set of rules minus the old rules. The atomic transition is accomplished by ignoring rules that have been flagged (e.g., the old rules). The above-described method can also be implemented in a system.

In an embodiment, a packet-based traffic forwarding lookup system is configured for use with a packet processor module that receives packets, performs lookups that utilize the system, and forwards the packets according to the lookups. The system includes a comparand structure, a content addressable memory (CAM), a priority arbiter, an associated data database, and a lookup table management module. The comparand structure is configured to contain a comparand associated with a packet. The comparand includes an atomic bit. The comparand structure may be implemented using a register. The CAM is configured to contain a set of comparand keys in a lookup table. Each comparand key includes a ternary atomic bit that is configured to have a value selected from the values consisting of on, off, and wildcard. A comparison of the comparand structure with each comparand key establishes one or more matches. The priority arbiter is configured to determine a best match of the one or more matches when a packet processor module performs a lookup for the packet. The associated data database is configured to contain data associated with the set of comparand keys. Each comparand key and data associated with the comparand key defines a rule and the rules define a rule configuration. The associated data database may be implemented using a static random access memory (SRAM). The lookup table management module is configured to turn off the atomic bit of the comparand; receive a set of new rules, including comparand keys with ternary atomic bits that are on, wherein when the set of new rules is received the rule configuration is an old rule configuration with an associated set of old rules; flag a subset of the set of old rules, that are to be deleted when transitioning from the old rule configuration to a new rule configuration, by turning off the ternary atomic bit of each comparand key of the subset of old rules; add each comparand key of the set of new rules to the lookup table; and turn on the atomic bit of the comparand, thereby atomically transitioning from the old rule configuration to the new rule configuration. The lookup table management module may further be configured to delete each comparand key of the subset of old rules, set the ternary atomic bit of each comparand key of the set of new rules to wildcard, and turn off the atomic bit of the comparand. The lookup table management module may be implemented using a memory containing executable code and a processor for executing the executable code. The system may further include a lookup engine configured to obtain lookup criteria from a packet, store in the comparand structure the lookup criteria, receive from the priority arbiter the best match of the matches for the lookup criteria, find data associated with the lookup criteria in the associated data database, obtain routing information from the associated data, and send the routing information to a packet processor module. The packet processor module forwards the packet according to the routing information.

In another embodiment, a computer program product for managing lookup rules in a ternary CAM includes computer code for turning off an atomic bit of a comparand; switching off ternary atomic bits of respective comparand keys for a subset of old rules; adding new rules with ternary atomic bits of respective comparand keys of the new rules set to on, wherein the atomic bit of the comparand does not match the ternary atomic bits of the respective comparand keys of the new rules when the new rules are added; and turning on the atomic bit of the comparand, thereby atomically transitioning from an old rule configuration to a new rule configuration that includes the new rules and the old rules excluding the subset. The computer program product may further include computer code for deleting each comparand key of the subset of old rules; setting the ternary atomic bit of each comparand key of the new rules to wildcard; and turning off the atomic bit of the comparand, wherein the turning off of the atomic bit of the comparand has no effect on matching the comparand to each comparand key of the new rules because the ternary atomic bit of each comparand key of the new rules has a wildcard value.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
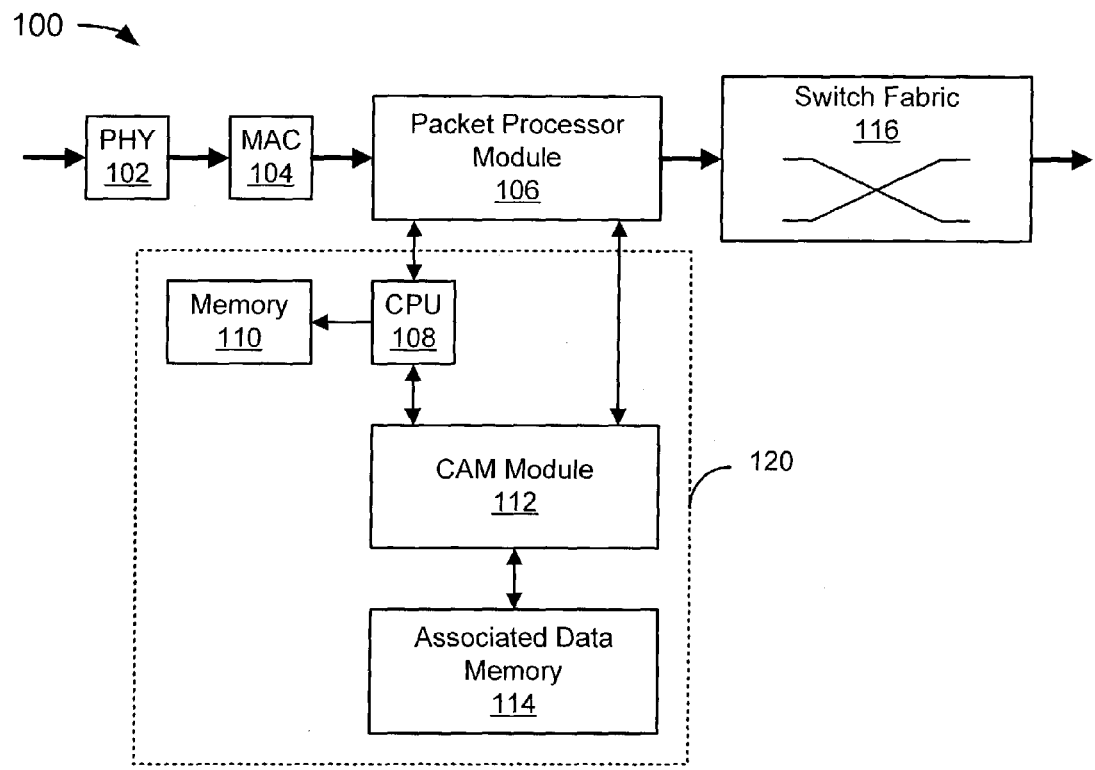
FIG. 1 depicts relevant functional blocks of a network node that forwards packets within a network.

FIG. 1 depicts relevant functional blocks of a network node 100, such as a switch or a router, that forwards packets within a network. The network node 100 includes a PHY 102, a MAC 104, a packet processor module 106, a switch fabric 116, and a lookup engine 120. The lookup engine 120 includes a CPU 108, memory 110, a CAM module 12, and an associated data memory 14. In an embodiment, the network node is an Ethernet-based switch/router.

The PHY 102 is the physical interface between the incoming signals and the network node. In an embodiment that includes an optical connection, the PHY converts incoming light pulses into electrical signals and then identifies the incoming data segments (e.g., incoming Ethernet frames). The PHY forwards the incoming data segments to the MAC 104. The PHY is a well-known functional unit in switches and routers and is not described in further detail.

The MAC 104 manages the layer 2 addressing control for the network nodes. For bridged data segments (i.e., Ethernet frames), the MAC reads the layer 2 header of incoming data segments and may perform layer 2 lookups to determine how to forward the incoming data segments to their next destination within the network node. For routed data segments (e.g., IP packets), the MAC forwards the data segments to the packet processor module 106.

The packet processor 106 performs layer 3 address lookups for routed data segments (e.g., IP packets). In an embodiment, the packet processor may also perform layer 2 forwarding functions. As shown in FIG. 1, the packet processor is in communication with the lookup engine 120.

The CPU 108 is a multifunction processor that performs various management functions. In an embodiment, the PHY 102, MAC 104, packet processor 106, and lookup engine 120 are located on the same line card and the CPU handles control functions on the line card. The CPU implements software instructions. Software instructions that are implemented by the CPU may be stored in the memory 10. In an embodiment, the memory is dynamic random access memory (DRAM) that is accessible to the CPU. As is described below, the CPU provides instructions for updating the lookup engine 120 in a manner that results in an atomic transition from a first rule configuration to a second rule configuration.

The CAM module 112 includes lookup criteria that are used to determine a next hop for routed packets. Lookup criteria may include interface IDs, source IP addresses, destination IP addresses, source ports, destination ports, protocols, and other values that may be obtained from a packet using the packet's header or traffic class. The associated data memory 114 includes information associated with the lookup criteria that the packet processor module 106 uses to forward packets, such as next hop IP addresses, exit port mapping and exit destination MAC addresses. In the case of multicast packets, route information includes multiple next hop IP address exit ports and multiple exit destination MAC addresses.

The switch fabric 116 creates a datapath between an input packet processor and an output packet processor. Switch fabrics that are utilized with Ethernet switch/routers are known in the field and may include shared memory, shared bus, and cross point matrices.

Figure 2:
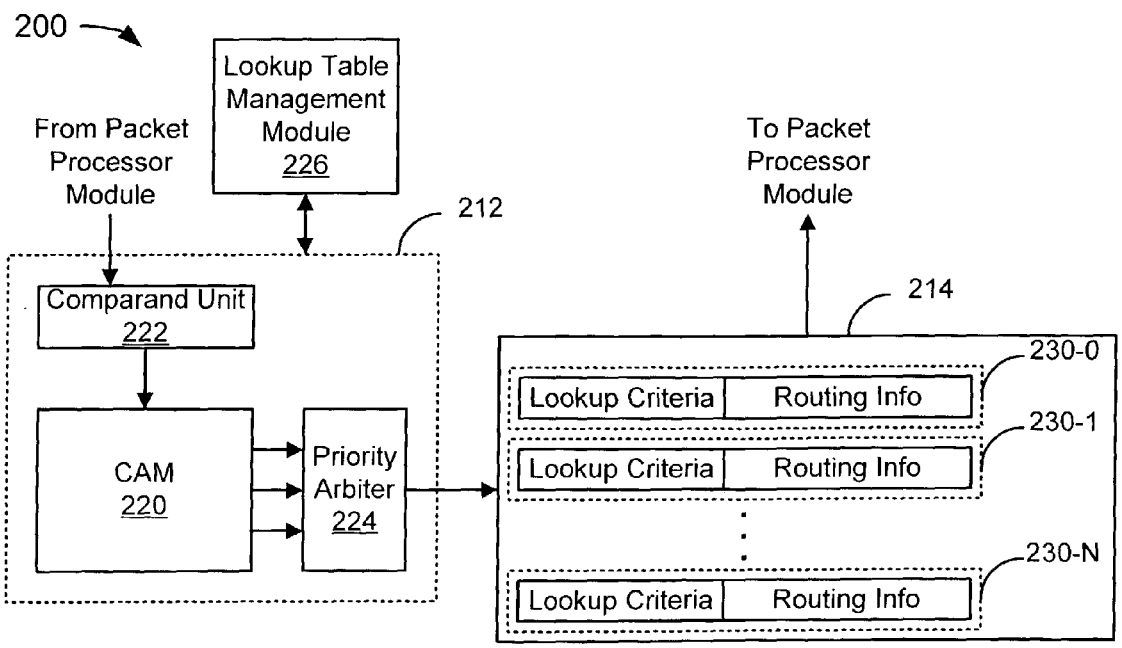
FIG. 2 depicts an expanded view of the lookup engine shown in FIG. 1.

FIG. 2 depicts an expanded view of the lookup engine 120 shown in FIG. 1. The expanded view depicts a lookup engine 200 that includes a lookup table management module 226, a CAM module 212, and an associated data memory 214. The lookup table management module 226 may be embodied in a CPU and memory (not shown), such as the CPU 108 and memory 110 (FIG. 1). In an embodiment, the CPU is shared with modules outside the lookup engine 120, such as the packet processor module 106 (FIG. 1) and the memory includes executable code that is used by modules outside the lookup engine 120, such as the packet processor module 106. The associated data memory 214 includes a plurality of entries 230-0 to 230-N. Each entry of the associated data database includes lookup criteria and associated data. In an embodiment, the associated data is routing information. The entries may be referred to collectively as an associated data database 230.

The CAM module 212 includes a CAM 220, a comparand unit 222, and a priority arbiter 224. In an embodiment, the CAM 220 includes a lookup table. In this embodiment, the lookup table stores CAM entries in CAM locations. The CAM locations are typically organized in rows of individual CAM memory cells. A CAM location includes a series of CAM memory cells that store a CAM entry word, a CAM prefix mask word, and a CAM entry result. The CAM entry word, the CAM prefix mask word associated with the CAM entry word, and the CAM entry result together define a ternary CAM entry. The CAM entry is ternary because each bit of the CAM entry word and a corresponding bit of the CAM prefix mask word together define a ternary bit that is configured to have a value of "0", "1", or "X" (i.e., "wildcard"). The value "0" may be referred to as "off" and the value "1" may be referred to as "on" or vice versa. Each CAM location is assigned a CAM index that identifies the CAM entry. In an embodiment, a CAM array has 64K CAM locations that are indexed from 0 to 65,535.

When the lookup engine 200 performs a lookup operation for a packet received by a packet processor module, such as the packet processor module 106 (FIG. 1), the lookup engine obtains lookup criteria from the packet. The lookup criteria may include, for example, any combination of L2, L3, and L4 information. Often, in L3 lookups, the lookup criteria is a destination IP address. The lookup engine writes the lookup criteria to a comparand structure that is configured to contain the comparand associated with the packet.

The comparand structure is a comparand register (not shown) of the comparand unit. The comparand unit applies a comparand to the CAM 220. The comparand is compared with each ternary CAM entry. Each bit of a ternary CAM entry matches a corresponding bit of the comparand when the bit of the ternary CAM entry either has the same value as the corresponding bit of the comparand or has a value of "X" ("wildcard"). Since the comparand is compared with each ternary CAM entry, the ternary CAM entries may be referred to more generally as comparand keys. Accordingly, henceforth, the more general term comparand key is used when referring to lookup table entries.

The priority arbiter 224 resolves one or more matches to determine the longest prefix match or, more generally, the best match. In an embodiment, the CAM 220 is ordered such that longer prefix matches are closer to the top of the lookup table (e.g., the indexes of the longer prefix matches are lower). Accordingly, in an embodiment, the priority arbiter selects the CAM entry with the lowest index value of the one or more matches as the best match. The result of the lookup is the CAM entry result from the CAM entry, which may be in the form of a pointer. The lookup engine uses the pointer to find data associated with the lookup criteria in the associated data database 230 and obtains routing information from the associated data. The lookup engine sends the routing information to a packet processor module, such as the packet processor module 106 (FIG. 1). Then the packet processor module forwards the packet according to the routing information. Note that the lookup criteria and the routing information associated with the lookup criteria may be referred to as defining a rule. Active rules may be referred to in the aggregate as defining a rule configuration.

The lookup table management module 226 manages the updating of the CAM 220. The lookup table management module receives new lookup table entries and lookup table status information and generates lookup table update instructions. The function of the lookup table management module is the focus of the invention that is described in detail below.

Figure 3:
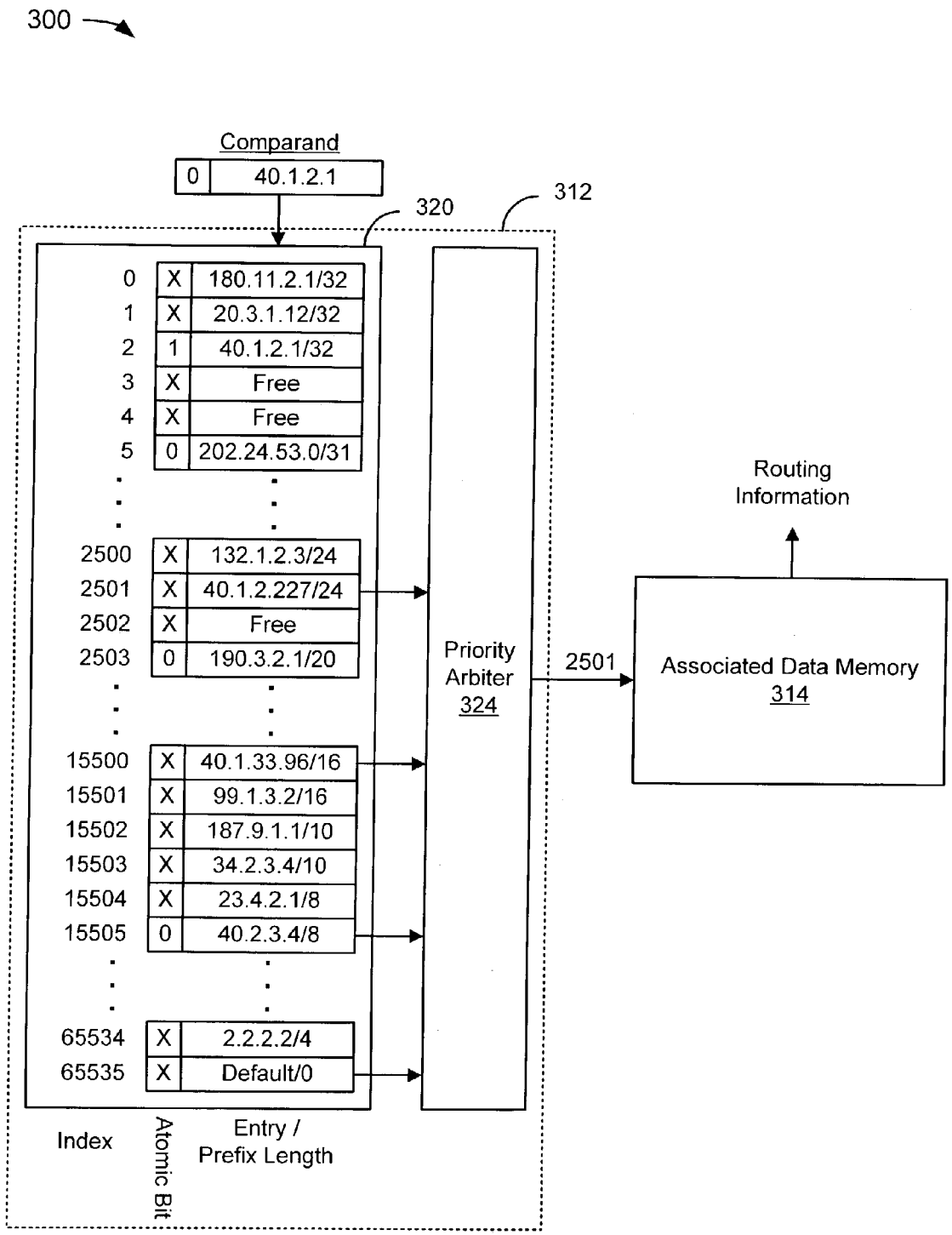
FIG. 3 depicts an expanded view of the lookup engine shown in FIG. 1.

FIG. 3 depicts an expanded view of the lookup engine 120 (FIG. 1). The lookup engine 300 includes a CAM module 312 and an associated data memory 314. The CAM module includes a lookup table 320 and a priority arbiter 324. The lookup table is populated with exemplary lookup table entries that are used below to describe an example lookup operation. Each location in the lookup table has an associated index. In the embodiment of FIG. 3, the lookup table includes 64K entries and the index values range from 0 to 65,535, with index 0 being at the "top" of the lookup table and index 65,535 being at the "bottom" of the lookup table. The lookup table is populated with lookup table entries, with each lookup table entry having an associated prefix length (i.e., 180.11.2.1/32). The lookup table entries and related prefix lengths are presented in the well-known convention of entry/prefix length. The lookup table entries are grouped by prefix length into prefix levels within the lookup table and lexicographically ordered according to prefix level. The prefix lengths of the lookup table entries define the prefix levels within the lookup table. In the embodiment of FIG. 3, the entries at prefix level thirty-two (/32) are followed by the entries at prefix level thirty-one (/31) and so on. The longest prefix length is considered to have the highest priority and the priority of the lookup table entries decreases as the prefix lengths decrease. In the embodiment of FIG. 3, the lookup table locations are indexed from the longest prefix length (lowest index number) to the shortest prefix length (highest index numbers) although in other embodiments the indexing can be reversed. Although thirty-two prefix levels (plus the default prefix level) are available, every prefix level may not be represented by a lookup table entry.

In a lookup operation, a comparand is applied to the CAM 320 and all of the lookup table locations are simultaneously compared to the comparand for lookup table entry matches. If no lookup table entry matches are found, the lookup operation is complete. If one lookup table entry match is found, then the lookup table outputs a match signal that identifies the index where the match was found. The index is used to identify the associated routing information that is stored in the associated data memory. If multiple matches are made, the priority arbiter 324 receives multiple index values. The priority arbiter compares the index values and determines the highest priority match among the multiple matches. The highest priority match is the match with the lowest index.

In accordance with an embodiment of the invention, the comparand and the lookup table entries include an atomic bit. In an embodiment, the atomic bit is the most significant bit of the comparand. Accordingly, since the atomic bit is the most significant bit, if the atomic bit of the comparand does not match the atomic bit of a ternary CAM entry, then the ternary CAM entry should not be a best match for the comparand. It follows that each matching CAM entry must have an atomic bit that matches the atomic bit of the comparand.

In accordance with an embodiment of the invention, the comparand and CAM entries use the atomic bit to achieve atomic rules set transition. In general, this is achieved by setting the comparand atomic bit to an operational value. In an embodiment, the operational value of the comparand atomic bit is off (e.g., "0"). The atomic bits of the CAM entries are also set to operational values. In an embodiment, the operational value of a CAM entry is unflagged (e.g., "X"). (It should be noted that CAM entries with either the values "0" or "1" may be referred to as flagged.) Accordingly, since an atomic bit that is off (e.g., "0") always matches an atomic bit that is unflagged (e.g., "X"), during normal operation the atomic bit of the comparand and the atomic bits of the CAM entries match. When a new rule configuration is desired, the CAM entries that are associated with old rules (e.g., rules that were used under the old rule configuration, but are not used under the new rule configuration) are flagged by turning off their atomic bits (e.g., by changing the CAM entry atomic bits from "X" to "0") and the CAM entries that are new (e.g., rules that were not used under the old rule configuration, but are used under the new rule configuration) are added and flagged by turning on their atomic bits (e.g., by setting the CAM entry atomic bits to "1"). Flagging the rules does not change the rule configuration since the atomic bit of the comparand continues to match the atomic bit of the old rules, but not the atomic bit of the new rules. After the rules are flagged, the atomic transition is accomplished by turning on the atomic bit of the comparand (e.g., by changing the atomic bit of the comparand from "0" to "1"). Then, the old rules (e.g., rules flagged with a "0") are deleted and the new rules (e.g., rules flagged with a "1") are unflagged (e.g., the CAM entries associated with the new rules have their atomic bits changed from "1" to "X"). Finally, the atomic bit of the comparand is changed back to its operational value (e.g., changed from "1" to "0").

Figure 4A:
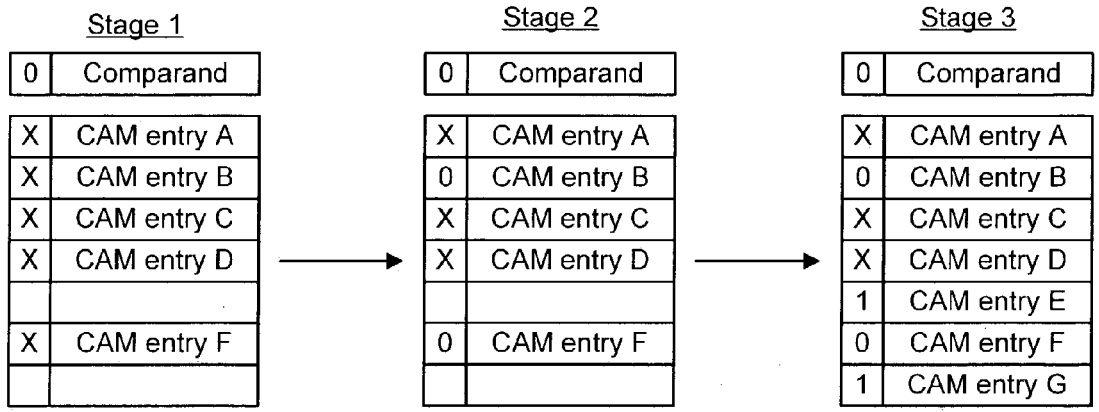
FIGS. 4A to 4C depict an exemplary atomic rule set transition procedure.
Figure 4B:
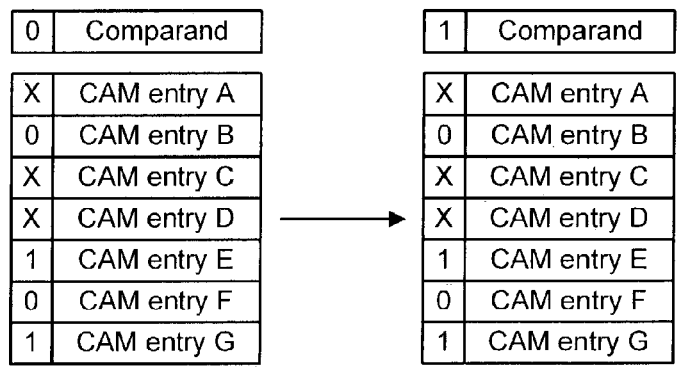
Figure 4C:
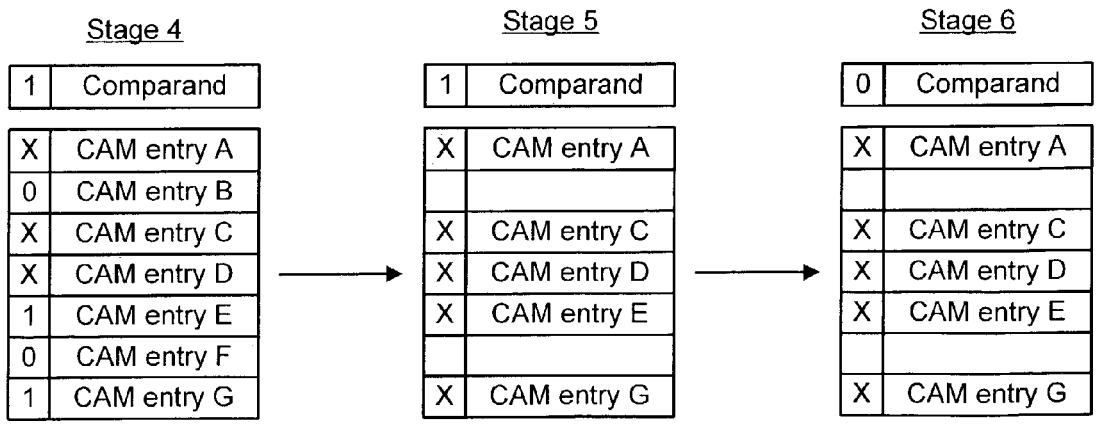

FIGS. 4A to 4C depict an exemplary atomic rule set transition procedure. FIG. 4A depicts three stages of preparation for an atomic rule set transition from a first configuration. At stage 1, the comparand atomic bit is off (e.g., "0"). The rule configuration includes the set of rules {A, B, C, D, F} that are respectively associated with CAM entries A-D and F. At stage 2, old rules are flagged by turning off (e.g., changing from "X" to "0") the atomic bit of the CAM entry with which they are associated. The rule configuration is unchanged because the atomic bit of the comparand continues to match every rule illustrated in FIG. 4A. The set of old rules is {B, F}. At stage 3, new rules are added with atomic bits that are on (e.g., "1"). Again, the rule configuration is unchanged. The set of new rules is {E, G}. In an alternative, new rules are added before old rules are flagged. In yet another alternative, the new rules are added in parallel with flagging the old rules.

FIG. 4B depicts an atomic rule set transition. The CAM entries remain the same as in Stage 3 (FIG. 4A), but the atomic bit of the comparand is turned on (e.g., changed from "0" to "1"). Since the atomic bits of the old rules no longer match the atomic bit of the comparand, the configuration has been changed from the first rule configuration to a second configuration. The second configuration includes the set of rules {A, C, D, E, G}. Notably, none of the old rules are included in the configuration once a new rule is included in the configuration. Similarly, none of the new rules are included in the configuration while an old rule is included in the configuration. Therefore, the transition is atomic.

FIG. 4C depicts three stages following an atomic rule set transition to a second configuration. Stage 4 illustrates the state of the comparand and CAM entries immediately following the atomic transition of FIG. 4B. At stage 5, the CAM entries with atomic bits that are off (e.g., "0") are deleted and CAM entries with atomic bits that are on (e.g., "1") are unflagged (e.g., the atomic bits are changed from "1" to "X"). At stage 6, the atomic bit of the comparand is turned off (e.g., changed from "1" to "0"). Since the operational value of the comparand is off and the operational values of the CAM entries are unflagged, stage 6 illustrates the state of the CAM entries and comparand when set back to their operational values.

Referring once again to FIG. 3, it should be apparent from the discussion of FIG. 4A, above, that the CAM 320 is in stage 3 (FIG. 4A), prior to an atomic rule set transition. In other words, some of the atomic bits of the CAM entries have operational values (e.g., "X"), while others are flagged (e.g., have values of "0" or "1"). FIG. 3 depicts a lookup that has returned three CAM entries that match the comparand, including the atomic bit of the comparand, and a default match. The lookup criteria at lookup table location 2 (index 2) matches the lookup criteria of the comparand, but the atomic bit at lookup table location 2 is on (e.g., "1") while the atomic bit of the comparand is off (e.g., "0"). Accordingly, no match is made with the lookup criteria at lookup table location 2. The exemplary lookup table entry matches are at index numbers 2501, 15500, and 15505, and the default index 65535. In the embodiment of FIG. 3, the match at lookup table location 2501 has the lowest index and therefore is identified by the priority arbiter as the highest priority match. CAM results (e.g., a pointer) from the highest priority match are then used to locate associated routing information that is stored in the associated data memory 314. The routing information is provided to a packet processor module, such as packet processor module 106, which uses the routing information to forward the associated packet.

Figure 5A:
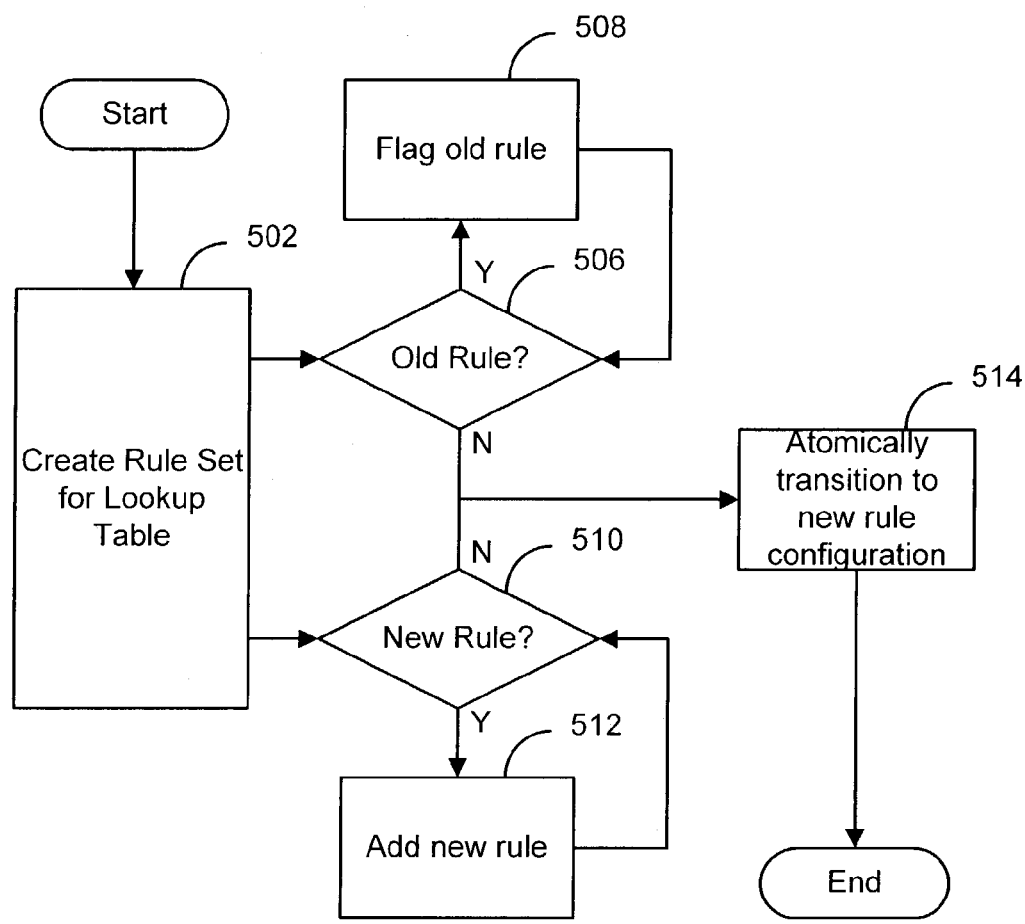
FIGS. 5A and 5B depict flowcharts of alternative methods for performing atomic lookup table updates according to an embodiment of the invention.

FIG. 5A depicts a flowchart 500A of a method for performing atomic lookup table updates. It is assumed that a rule configuration is in a first (current) rule configuration when the flowchart 500A begins and in a second (new) rule configuration when the flowchart 500A ends. The flowchart 500A begins at step 502 with creating a rule set for a lookup table. In an embodiment, a user or administrator creates the rule set. Alternatively, the rule set could be learned through the implementation of a protocol (e.g., a routing protocol). At decision point 506, it is determined whether an old rule remains in the first rule configuration. If an old rule remains in the first rule configuration, the old rule is flagged at step 508 and the flowchart returns to decision point 506. Steps 506 and 508 repeat until all old rules are flagged. At decision point 510 it is determined whether a new rule has not yet been added. If a new rule has not yet been added, then it is added at step 512 and the flowchart 500A returns to decision point 510. Steps 510 and 512 are repeated until all of the new rules have been added. The order in which old rules are flagged and new rules are added is not critical, but the ability to flag old rules and add new rules in any order is an advantage of this method. For the purposes of flowchart 500A, the flagging and adding are assumed to occur in parallel. When all of the old rules have been flagged and all of the new rules have been added, an atomic transition from the first rule configuration to the second rule configuration occurs at step 514 and the flowchart 500A ends. The atomic transition occurs when the flagged (old) rules cease to be used and the new rules begin to be used. This may be accomplished using the atomic bit of each rule as the flag and setting the atomic bit of a comparand to an unflagged, non-wildcard value. For example, if the flag is off (e.g., "0"), then the atomic bit of the comparand is turned on (e.g., changed from "0" to "1") to accomplish the atomic transition. Note that in this example the new rules should have atomic bit turned on (e.g., "1") when added so that the new rules are not used prior to the atomic transition, but are used after the atomic transition.

Figure 5B:
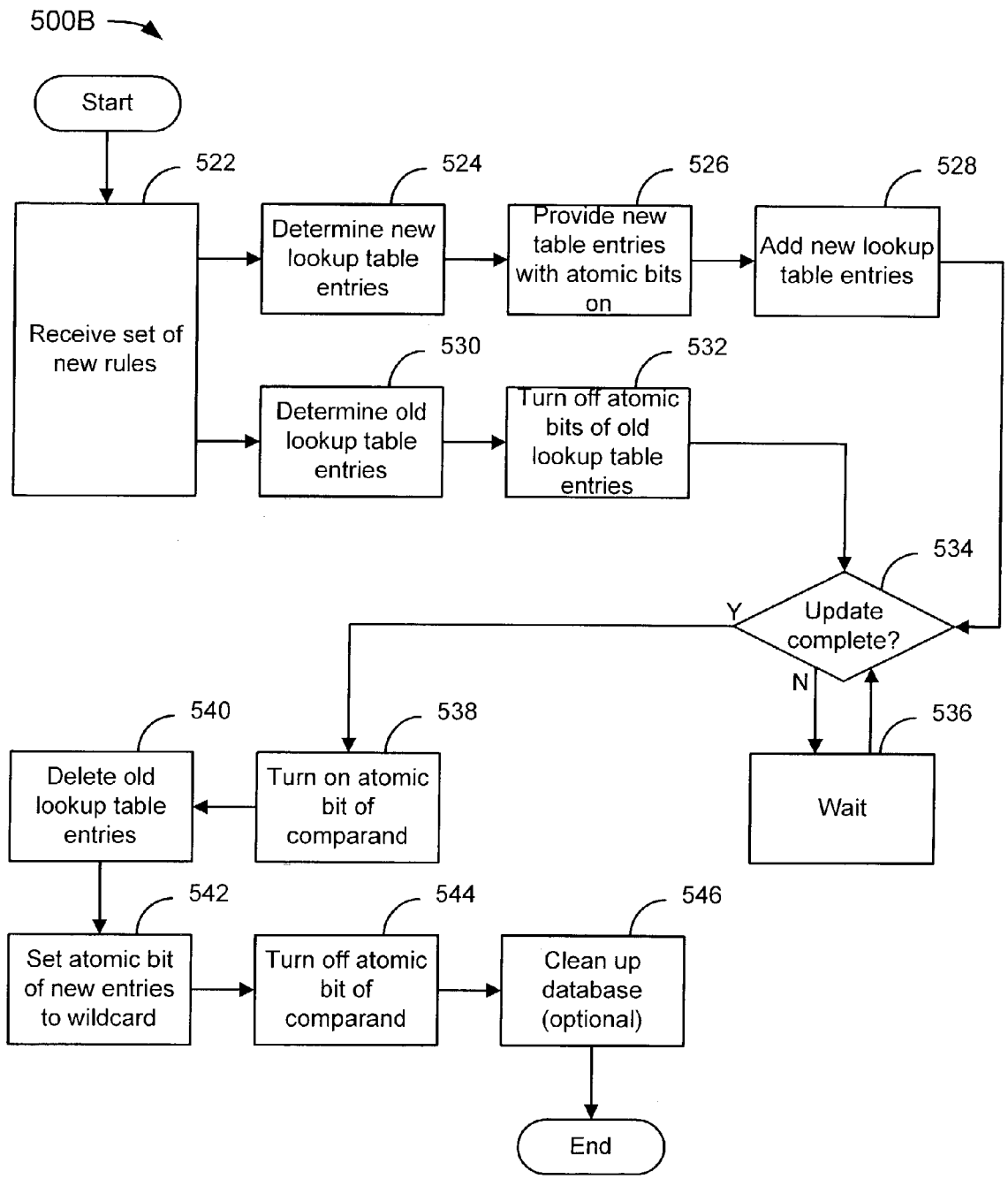

FIG. 5B depicts a method of performing atomic lookup table updates in an alternate embodiment. It is assumed that a rule configuration is in a first (current) rule configuration when the flowchart 500B begins and in a second (new) rule configuration when the flowchart 500B ends. When performing lookups with the lookup table, a comparand is compared to lookup table entries. The atomic bit of the comparand matches the atomic bit of lookup table entries if the lookup table entries have atomic bits set to wildcard or the same value as the atomic bit of the comparand. It should be noted that the comparand lookup criteria must still match lookup criteria of the lookup table entries in order to establish a best match. In other words, just because the atomic bits match does not necessarily mean that the lookup criteria match. In an embodiment, the atomic bit of the comparand is off (e.g., "0") in normal operation and the atomic bits of the lookup table entries are unflagged (e.g., "X"). Accordingly, in normal operation, the atomic bit of the comparand and the atomic bits of the lookup table entries match. The actual bit values of the atomic bits are not critical, but should be consistent.

The flowchart 500B begins at step 522 with receiving a set of new rules. Using the set of new rules, new lookup table entries are determined at step 524 and old lookup table entries are determined at step 530. The determinations at steps 524 and 530 may also include determinations of unchanged lookup table entries (not shown). No action need be taken with respect to unchanged lookup table entries as long as the unchanged lookup table entries have atomic bits that are unflagged (e.g., "X"). This is necessary because old and new rules are flagged by setting the atomic bit to different values and, in an embodiment, the atomic bit is ternary (i.e., it has only three values). After step 524, new table entries with atomic bits on (e.g., "1") are provided at step 526 and added to the lookup table at step 528. It should be noted that, just as with every other step, steps 526 and 528 could occur simultaneously or in reverse order. After step 530, the atomic bits of old lookup table entries are off (e.g., "0"). Steps 524 to 528 and 530 to 532 may be performed serially or in parallel. After step 528 and 532, it is determined at decision point 534 whether an update has been completed. An update is completed when all new table entries have been added to the lookup table and all old table entries have been flagged in the lookup table. If the update is not complete, then the flowchart 500B waits at step 536 for the update to become complete.

Once the update is complete, the atomic bit of a comparand is turned on (e.g., changed from "0" to "1") at step 538. This is different from the normal operation value of the comparand atomic bit. When the atomic bit is turned on, an atomic transition from the first configuration using the old rules to the second configuration using the new and unchanged rules occurs. Thus, there are no transient state rules (i.e., one or more old rules applied while one or more new rules are also being applied). In other words, every rule associated with an atomic bit that matches the atomic bit of the comparand is a non-transient rule. Since the old rules are no longer needed following the transition to the second configuration, the old lookup table entries are deleted at step 540. The old lookup table entries are identifiable because they were flagged (e.g., set to "0") at step 532. At step 542, the atomic bits of the new entries are unflagged (e.g., changed from "1" to "X"). This makes the atomic bits of the new entries the same as the atomic bits of old unchanged rules. At step 544, the atomic bit of the comparand is turned off (e.g., changed from "1" to "0"). Since all of the rules of the second configuration have unflagged (e.g., "X") atomic bits, turning off the atomic bit of the comparand has no effect on the application of rules. At this point, normal operation resumes with the atomic bit of the comparand off (e.g., "0"). At step 546, an associated data database related to the rules may (optionally) be cleaned up, and then the flowchart 500B ends. Cleaning up the database entails removing associated data for lookup table entries that have been deleted. If necessary, new database entries would typically be added before the atomic transition (not shown).

In one embodiment, the methods described above are embodied in a computer-readable media as computer instruction code. It shall be appreciated that not all methods steps described must be performed, nor must they be performed in the order stated.

Although specific embodiments of the invention have been described and illustrated, the invention is not to be limited to the specific forms or arrangements of parts as described and illustrated herein. The invention is limited only by the claims.

What is claimed is:

1. A method for managing lookup rules in a ternary content addressable memory (CAM), comprising:
   performing lookups using a first set of rules;
   flagging a subset of the first set of miles as old rules;
   adding a second set of rules, while continuing to perform lookups using the first set of rules; and
   atomically transitioning to perform lookups using the first set of rules plus the second set of rules minus the old rules, wherein said atomically transitioning further comprises changing an atomic bit in a comparand, the comparand being applied to the ternary CAM to perform a lookup.

2. The method of claim 1, wherein said first set of rules, excluding said subset, are not flagged and said second set of rules are flagged as new rules, further comprising:
   using lockup rules that are not flagged, and using lockup rules that are flagged as old rules, prior to said atomically transitioning, wherein said atomically transitioning further comprises ceasing to use lookup rules that are flagged as old rules and beginning to use lockup rules that are flagged as new rules.

3. The method of claim 2, further comprising
   unflagging the new rules; and
   deleting the rules flagged as old rules.

4. The method of claim 1, wherein said performing lookups using said first set of rules further comprises:
   performing, on each rule of the first set of rules, an order of one comparison with a comparand associated with a traffic class of a packet for which the lookup is being performed; and
   electing a rule of the first act of rules that is a best match for the comparand.

5. A packet-based traffic forwarding lookup system configured for use with a packet processor module that receives packets, performs lookups that utilize said system, and forwards said packets according to the lookups, comprising:
   a comparand structure including a comparand atomic bit;
   a lookup table having a plurality of lookup table entries, wherein each lookup table entry is associated with a respective atomic bit and a respective rule, wherein a comparison of the comparand structure with the lookup table entries for which the comparand atomic bit and the respective atomic bits match, establishes one or more matches; and a lookup table management module configured to manipulate the atomic bit and the respective atomic bits to atomically update the lookup table entries such that the respective rules associated with the one or more matches, are non-transient.

6. The system of claim 5, wherein the lookup table is embodied in a content addressable memory (CAM).

7. The system of claim 5, said lookup table management module further comprising:
memory including executable code for routines the lookup table management module is configured to perform; and
a processor for executing said routines.

8. The system of claim 5, wherein said lookup table entries further include respective comparand keys, and wherein said comparison further comprises comparing the comparand structure with the respective comparand keys.

9. The system of claim 8, wherein said comparand atomic bit is in a most significant bit location of the comparand and wherein said respective atomic bits are in most significant bit locations of each comparand key.

10. The system of claim 5, wherein said respective atomic bits are configured to include values selected from the values consisting of on, off, and wildcard, wherein said lookup table management module is further configured to:
turn off the comparand atomic bit;
receive a set of new rules, wherein when the set of new rules is received the rule configuration is an old rule configuration with an associated set of old rules;
flag a subset of the set of old rules, that are to be deleted when transitioning from the old rule configuration to a new rule configuration, by turning off the respective atomic bit of each lookup table entry associated with a respective rule of the subset of old rules;
add to the lookup table new lookup table entries, respectively associated with rules of the set of new rules, with respective bits that are on;
turn on the comparand atomic bit, thereby atomically transitioning from the old rule configuration to the new rule configuration.

11. The system of claim 10, wherein said lookup table management module is further configured to:
delete each lookup table entry associated with a rule of the subset of old rules;
set to wildcard the respective atomic bits associated with rules of the set of new rules; and
turn off the comparand atomic bit.

12. The system of claim 11, wherein said comparand structure is configured to include a comparand associated with a packet, further comprising:
a priority arbiter configured to determine a best match of the one or more matches when a packet processor module performs a lookup for a packet; and
an associated data database configured to contain data associated with the set of comparand keys, wherein each comparand key and data associated with the comparand key defines a rule and wherein the rules define a rule configuration.

13. The system of claim 12, wherein said system receives said packet from a packet processor module, further comprising:

a lookup engine configured to:
obtain lookup criteria from a packet;
store in the comparand structure the lookup criteria;
receive from the priority arbiter the best match of said one or more matches for the lookup criteria;
find data associated with the lookup criteria in the associated data database;
obtain routing information from the associated data; and
send the routing information to a packet processor module, wherein the packet processor module forwards the packet according to the routing information.

14. The system of claim 13, said lockup engine further comprising:
memory including executable code for applications the lookup engine is configured to perform; and
a processor for executing said applications.

15. The system of claim 12, wherein said comparand includes an Internet protocol (IP) address and said data associated with said best match includes routing information.

16. The system of claim 12, wherein the associated data database includes a static random access memory (SRAM).

17. A computer-readable medium encoded with computer instruction, code executed by a computer for managing lookup rules in a ternary content addressable memory (CAM), wherein rule matches are made by comparing a comparand to comparand keys, when executed, the computer instruction code performing the steps comprising:
turning off an atomic bit of a comparand;
switching off ternary atomic bits of respective comparand keys for a subset of old rules;
adding new rules with ternary atomic bits of respective comparand keys of the new rules set to on, wherein the atomic bit of the comparand does not match the ternary atomic bits of the respective comparand keys of the new rules when the new rules are added; and
turning on the atomic bit of the comparand, thereby atomically transitioning from an old rule configuration to a new rule configuration that includes the new rules and the old rules excluding the subset.

18. The computer-readable medium of claim 17, further comprising computer instruction code for:
deleting each comparand key of the subset of old rules;
setting the ternary atomic bit of each comparand key of the new rules to wildcard; and turning off the atomic bit of the comparand, wherein said turning off of the atomic bit of the comparand has no effect on matching the comparand to each comparand key of the new rules because the ternary atomic bit of each comparand key of the new rules has a wildcard value.

19. The computer-readable medium of claim 18, further comprising computer instruction code for:
deleting rules data that is exclusively associated with the comparand keys of the subset of old rules.

* * * * *